(12) United States Patent
Wilson et al.

(10) Patent No.: US 8,235,656 B2
(45) Date of Patent: Aug. 7, 2012

(54) CATENARY TURBINE SEAL SYSTEMS

(75) Inventors: Ian Wilson, Simpsonville, SC (US);
Kenneth Black, Travelers Rest, SC (US); Josef Scott Cummins, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 12/370,960

(22) Filed: Feb. 13, 2009

(65) Prior Publication Data
US 2010/0209233 A1    Aug. 19, 2010

(51) Int. Cl.
*F01D 25/24* (2006.01)
(52) U.S. Cl. .............. 415/173.7; 415/174.5; 416/218
(58) Field of Classification Search ........ 415/173.4, 415/173.7, 174.5, 173.1; 416/220 R, 96 R, 416/218
See application file for complete search history.

(56) References Cited

U.S. PATENT DOCUMENTS

| | | | |
|---|---|---|---|
| 2,623,357 A | 12/1952 | Birmann | |
| 2,948,060 A | 12/1960 | Engelberger | |
| 3,018,085 A * | 1/1962 | Welsh | 415/136 |
| 3,258,067 A | 6/1966 | Fleur | |
| 3,433,020 A | 3/1969 | Earle, Jr. et al. | |
| 5,236,302 A | 8/1993 | Weisgerber et al. | |
| 5,275,534 A | 1/1994 | Cameron et al. | |
| 5,288,210 A | 2/1994 | Albrecht et al. | |
| 5,318,405 A | 6/1994 | Meade et al. | |
| 5,338,154 A | 8/1994 | Meade et al. | |
| 5,472,313 A | 12/1995 | Quinones et al. | |
| 5,535,585 A | 7/1996 | Eichhorn | |
| 5,630,703 A * | 5/1997 | Hendley et al. | 416/95 |
| 5,660,526 A * | 8/1997 | Ress, Jr. | 416/198 A |
| 6,267,553 B1 | 7/2001 | Burge | |
| 6,464,453 B2 * | 10/2002 | Toborg et al. | 415/115 |
| 6,899,520 B2 | 5/2005 | Habedank et al. | |

OTHER PUBLICATIONS

GE Aero Engergy; LM2500+ Marine Gad Turbine; http://www.gepower.com/prod_serv/products/aero_turbines/en/downloads/lm2500plus.pdf.

* cited by examiner

*Primary Examiner* — Caridad Everhart
(74) *Attorney, Agent, or Firm* — Fletcher Yoder, P.C.

(57) ABSTRACT

In one embodiment, a catenary seal structure may be mechanically supported only by two adjacent rotor wheels to isolate a volume between the two adjacent rotor wheels. The catenary seal structure may be annularly disposed about the rotational axis of the adjacent rotor wheels.

20 Claims, 4 Drawing Sheets

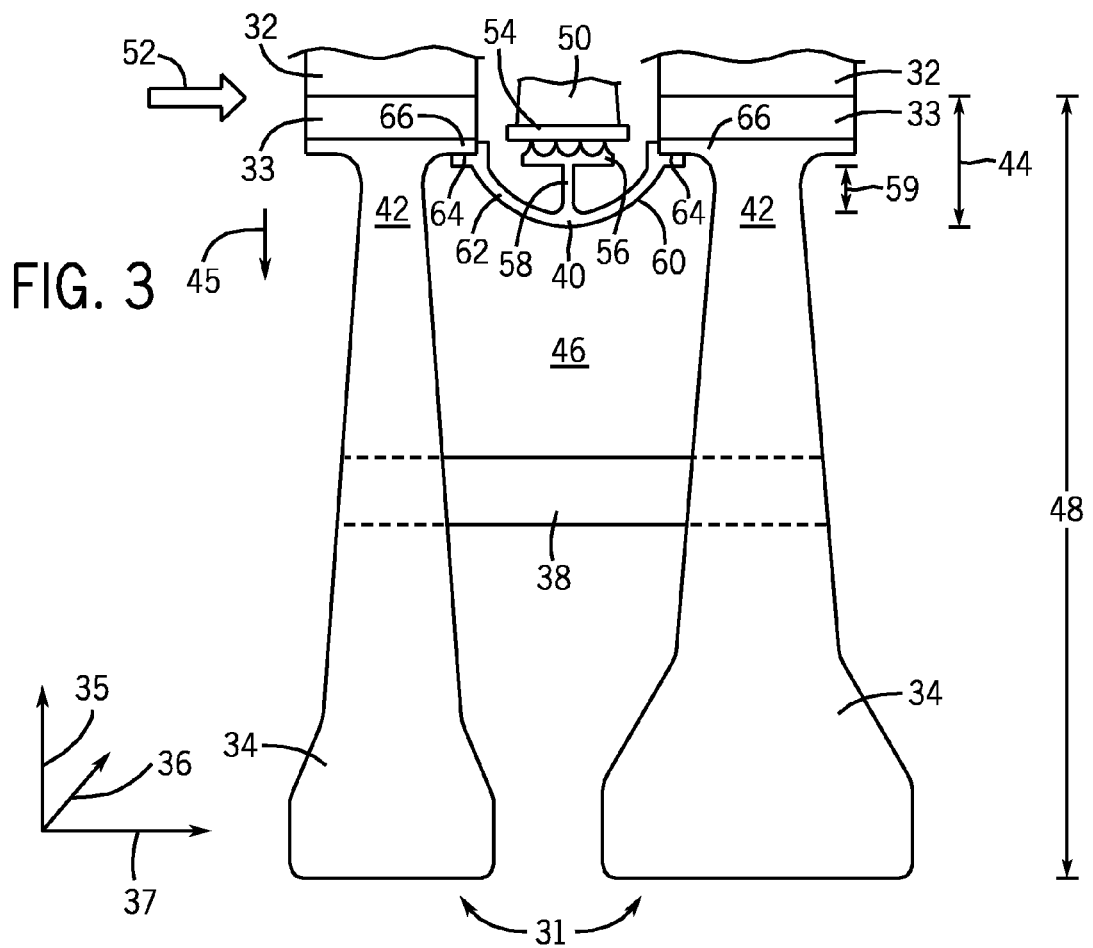
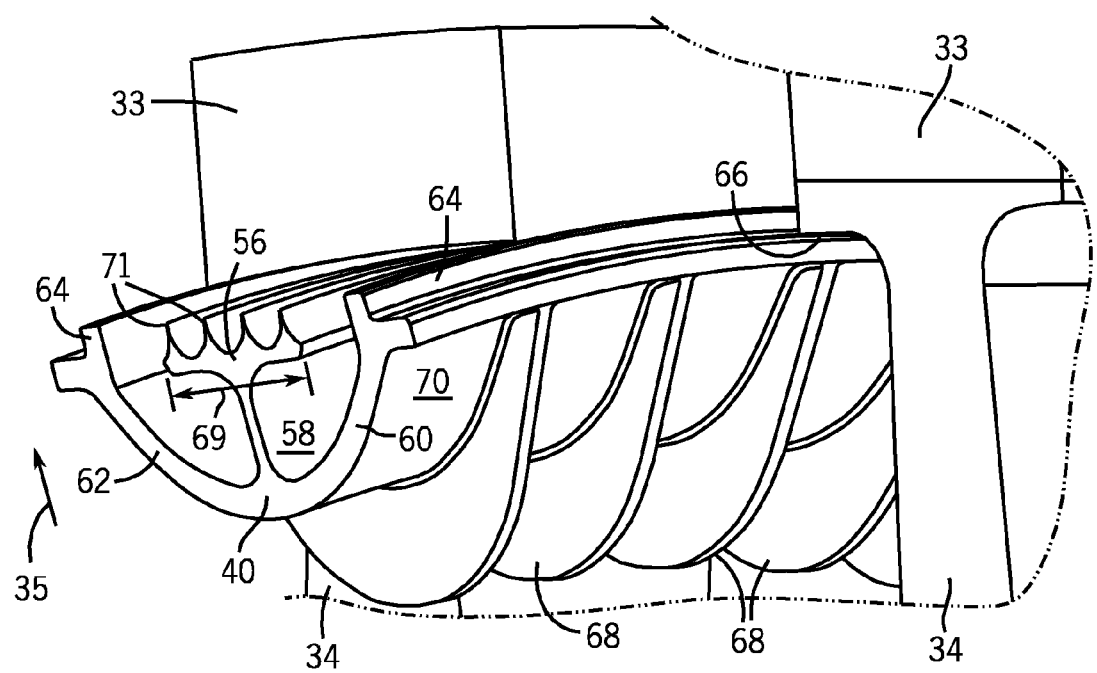

CATENARY TURBINE SEAL SYSTEMS

BACKGROUND OF THE INVENTION

The subject matter disclosed herein relates to gas turbine engines, and more specifically, to seals within turbines.

In general, gas turbine engines combust a mixture of compressed air and fuel to produce hot combustion gases. The combustion gases may flow through one or more turbine stages to generate power for a load and/or a compressor. A pressure drop may occur between stages, which may promote flow of a fluid, such as combustion gases, through unintended paths. Seals may be disposed between the stages to reduce fluid leakage between stages.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a pair of adjacent rotor wheels configured to rotate about an axis. The system also includes a catenary seal structure mechanically supported only by the adjacent rotor wheels and disposed annularly about the axis to isolate a volume between the adjacent rotor wheels from combustion gases flowing over the adjacent rotor wheels.

In a second embodiment, a system includes a catenary seal structure configured to be annularly disposed about an axis and mechanically supported by two adjacent rotor wheels configured to rotate about the axis. The catenary seal structure is configured to isolate a volume between the adjacent rotor wheels from hot fluids flowing over the adjacent rotor wheels. The system also includes a pair of connection interfaces configured to be annularly disposed about the axis on opposite axial faces of the catenary seal structure and configured to attach the catenary seal structure to the adjacent rotor wheels to mechanically support the catenary seal structure without intermediate support between the opposite axial faces of the catenary seal structure.

In a third embodiment, a system includes a rotary machine with a first rotor wheel rotational about an axis and including first blades extending radially from the first rotor wheel, a second rotor wheel rotational about the axis and including second blades extending radially from the second rotor wheel, and a catenary seal structure mechanically supported only by the first and second rotor wheels and disposed annularly about the axis to isolate a volume between the first and second rotor wheels from a flow path extending through the first and second blades.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a detail view of a portion of the gas turbine engine of FIG. 2 illustrating an embodiment of a seal between turbine stages;

FIG. 4 is a perspective view of another embodiment of a seal that includes ribs;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines that include interstage seals that are completely supported during operation by adjacent turbine wheels without additional radial support. The seals include catenary curves with ends that may be attached to a pair of adjacent turbine wheels to support the seals. The catenary shape and light weight of the seal structure allows the seal structure to be completely supported by the adjacent wheels without any intermediate support. In other words, embodiments of the seal do not include an intermediate radial support provided by spacer disks located between two adjacent wheels. The spacer disks (not included in the disclosed embodiments) may be attached to or emanate from the seals at an intermediate location along the rotational axis to radially support the seals. However, the spacer disks may increase costs and/or transfer bridge loads to the seals, which may cause fatigue.

Accordingly, in certain embodiments, the seals may be mechanically supported only by adjacent turbine wheels attached to the seal structure at opposite axial ends of the seals relative to the rotational axis. The opposite axial ends may each include a 360-degree circumferential surface disposed around the axis of rotation and spaced from the other end in the axial direction. No intermediate radial support may be provided for the seals. The catenary shape of the seals may reduce bending stress and transfer loads along the seal structure to the adjacent turbine wheels. Further, without intermediate support, the seals may be thermally and/or mechanically isolated from the bridge temperatures and loads. The elimination of intermediate seal support may also provide a continuous and non-divided space between adjacent turbine wheels to enhance cooling.

Figure 1:
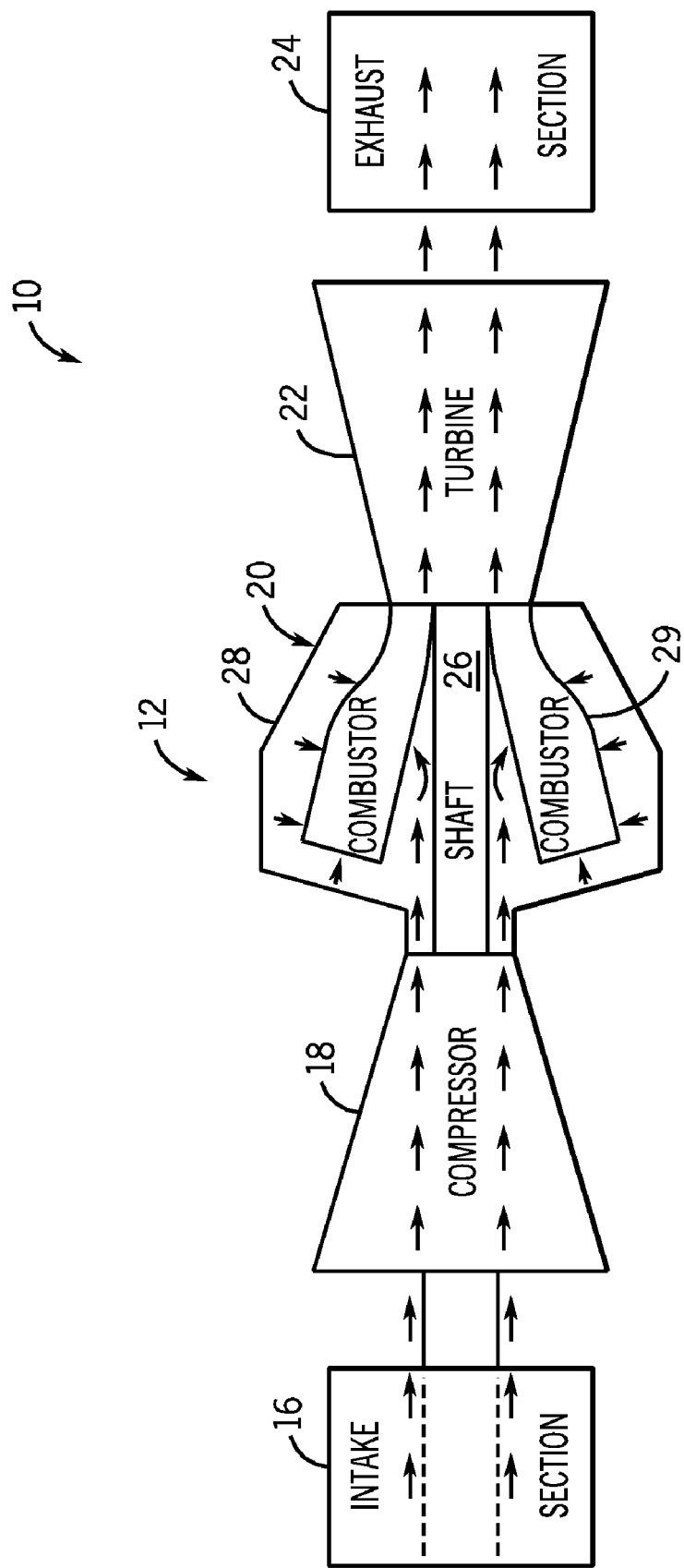
FIG. 1 is a schematic flow diagram of an embodiment of a gas turbine engine that may employ turbine seals.

FIG. 1 is a block diagram of an exemplary system 10 including a gas turbine engine 12 that may employ interstage catenary seals without intermediate supports. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 29 where the compressed air may mix and combust with fuel within the combustors 29 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
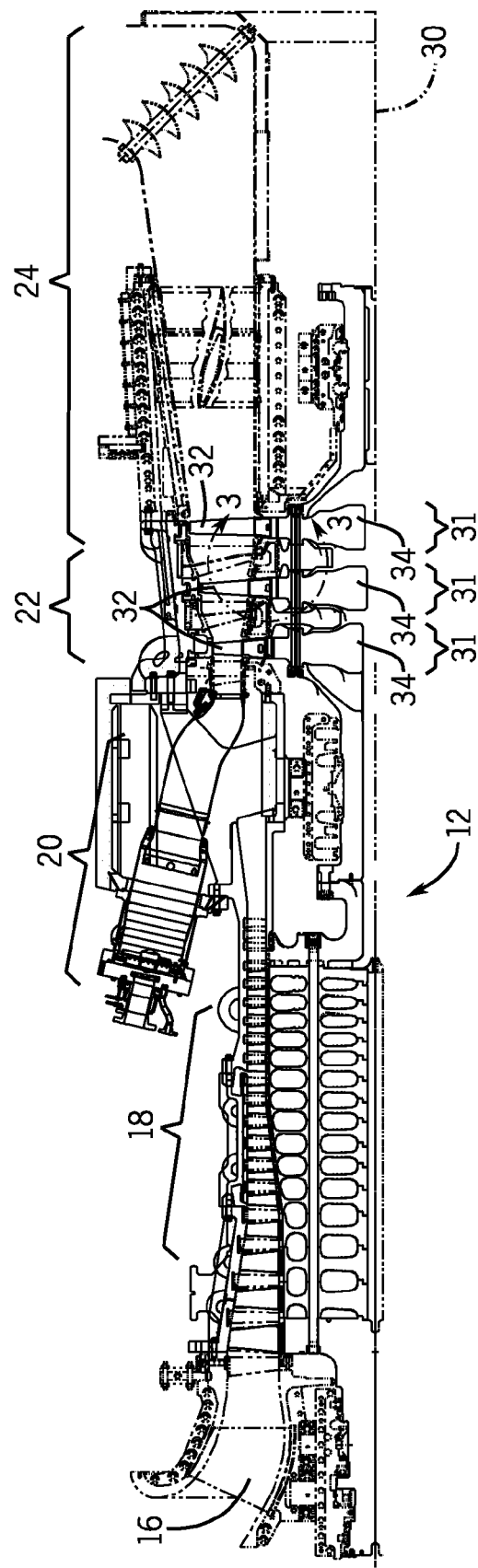
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis 30. As depicted, the gas turbine 22 includes three separate stages 31. Each stage 31 may include a set of blades 32 coupled to a rotor wheel 34 that may be rotatably attached to the shaft 26 (FIG. 1). The blades 32 may extend radially outward from the rotor wheels 34 and may be partially disposed within the path of the hot combustion gases. Seals may extend between and be supported by adjacent rotor wheels 34. Although the gas turbine 22 is illustrated as a three-stage turbine, the seals described herein may be employed in any suitable type of turbine with any number of stages and shafts. For example, the seals may be included in a single stage gas turbine, in a dual turbine system that includes a low-pressure turbine and a high-pressure turbine, or in a steam turbine. Further, the seals described herein may also be employed in a rotary compressor, such as the compressor 18 illustrated in FIG. 1.

As described above with respect to FIG. 1, air may enter through the air intake section 16 and be compressed by the compressor 18. The compressed air from the compressor 18 may then be directed into the combustor section 20 where the compressed air may be mixed with fuel gas. The mixture of compressed air and fuel gas is generally burned within the combustor section 20 to generate high-temperature, high-pressure combustion gases, which may be used to generate torque within the turbine 22. Specifically, the combustion gases may apply motive forces to the blades to turn the wheels 34. In certain embodiments, a pressure drop may occur at each stage of the turbine, which may promote airflow through unintended paths. For example, the hot combustion gases may flow into the interstage volume between turbine wheels 34, which may place thermal stresses on the turbine components. In certain embodiments, the interstage volume may be cooled by discharge air bled from the compressor or provided by another source. However, flow of hot combustion gases into the interstage volume may abate the cooling effects. Accordingly, the seals may be disposed between adjacent wheels 34 to seal and enclose the interstage volume from the hot combustion gases.

FIG. 3 is a detail view of a pair of adjacent rotor stages 31 shown in FIG. 2. For illustrative purposes, only a portion of the stages 31 are illustrated. However, the stages 31 may generally include circular wheels 34 with blades 32 extending radially outward (in the direction indicated by the arrow 35) from a wheel post portion 33 of the wheels 34. The wheel post portion 33 may be disposed along the circumference of the wheels 34 and may include slots for retaining the blades 32. In certain embodiments, approximately 50 to 150 blades may be mounted and spaced circumferentially around (in the direction indicated by the arrow 36, extending into the page) the wheels 34 and a corresponding axis of rotation (extending generally in the direction indicated by the arrow 37). The wheels 34 may be connected by a tie rod or bridge 38 that holds the wheels together. The bridge 38 may extend axially (direction 37) through the space between the wheels 34 and may transfer torque and other loads between the wheels. In certain embodiments, the bridge 38 may be bolted, welded, or otherwise attached to the wheels 34.

A catenary seal structure 40 extends between the two adjacent wheels 34 and is mechanically supported by the wheels 34. The catenary seal structure 40 may be annularly disposed (direction 36) between the wheels 34 and may be attached to the wheels 34 at interface regions 42 of the wheels 34. Each wheel 34 may form an annular structure with the catenary seal structure 40 extending as an annular structure between the wheels 34. During operation, the wheels 34 and the catenary seal structure 40 may rotate about a shared axis. The interface regions 42 may be disposed on the radially outward (direction 35) sections of the wheels 34. The interface regions 42 may have a height 44 that extends radially inward (arrow 45) from the perimeters of the wheels 34. In certain embodiments, the catenary seal structure 40 may interface with the wheels 34 at or near the same radial location (extending in direction 35) as the circumferentially spaced openings within the wheels 34 that retain the blades 32. The catenary seal structure 40 may include a 360-degree circular structure that attaches to adjacent wheels 34 to thermally isolate an interstage volume 46.

The interstage volume 46 may receive discharge air bled from the compressor to cool the interstage volume 46 and adjacent turbine components, such as the wheels 34 and the bridge 38. To promote cooling, the volume 46 may be designed to be as large as possible, and therefore, the seal structure 40 may be attached to the outermost portion of the wheels 34 at the interface regions 42. Specifically, the interface regions 42 may be disposed on the radially outward (direction 35) sections of the wheels 34. Each interface region 42 may have a height 44 that extends radially inward (direction 45) from the wheel post portions 33. In certain embodiments, the height 44 of the interface regions 42 may be at least less than approximately 0 to 50 percent of the total wheel height 48, and all subranges therebetween. More specifically, height 44 may be at least less than approximately 1 to 5 percent of the total height 48. The location of the seal structure 40 towards the radial outer section (direction 35) of the wheels 34, indicated generally by the interface regions 42, may maximize the volume of the interstage volume wheel cavity 46 to facilitate cooling within the volume 46. The increased size of the wheel cavity 46 and corresponding cooling capacity may allow lower strength material to be used for the wheels 34. Cooling also may be promoted because there is no radial division within the interstage volume 46. Specifically, within the radial direction 35, the volume 46 is a continuous space that may only be axially divided by the bridge 38.

The catenary seal structure 40 may interface with stationary stator vanes 50 to direct the flow of hot fluids, such as hot combustion gases or steam, within a flow path 52 (illustrated generally by an arrow) disposed above the wheels 34 that passes through the blades 32. Specifically, the stator vane structure 50 may include a seal surface 54 that interfaces with a seal rack 56 of the catenary seal structure 40. In certain embodiments, labyrinth seals may be formed between the seal surface material 54 and the seal rack 56. However, in other embodiments, any type of seal may be formed. The seal rack 56 may be positioned radially outward (direction 35) from the seal structure 40 and may be supported by a thin structure or web 58. The web 58 may have a height 59 that may be adjusted and/or optimized for individual turbine designs and configurations.

The seal structure 40 includes two arm segments 60 and 62 that extend from either side of the web 58. The arms 60 and 62 form a catenary, convex curve with a uniform or non-uniform cross-section (taken transverse to the axis of rotation indicated by direction 37) and density that extends inward towards the volume 46. Each arm 60 and 62 may hang freely (i.e., may not be supported by a separate structure) from an adjacent rotor wheel 34. Moreover, in certain embodiments, the seal structure 40 may maintain its shape when not attached to the rotor wheels 34. The catenary shape may reduce strain and bending stresses. Further, the catenary shape may allow the catenary structure 40 to be supported solely by the adjacent wheels 34, which may minimize the weight and cost of the turbine components. Specifically, no additional radial support is needed, for example, such as may be provided by a spacer disc.

The ends of the arms 60 and 62 may generally include connection interfaces, such as circumferential (direction 36) rabbet sections 64, designed to attach to rims 66 of the wheels 34. Each rabbet section 64 may form a rabbeted connection with the wheel rim 66. Specifically, each rabbet section 64 may include a groove or recess in the end of each arm 60 and 62 that is configured to fit with the rim 66 of the wheel 34. Each rabbet section 64 may form a 360-degree ring that interfaces with a complementary 360-degree circular edge of the rim 66. The rabbet sections 64 may be disposed on opposite axial circumferential ends of the seal structure 40. For example, the seal structure may include two 360-degree circumferential surfaces each disposed around the axis of rotation (direction 37). In other embodiments, other types of connection interfaces 64 may be employed, such as flanges, bayonets, snaps, tongue and grooves, and interference fits, among others. In certain embodiments, the location of the rabbet section 64 may be reversed. Specifically, the rims 66 may include a rabbet section 64 configured to interface with the ends of the arms 60 and 62. Further, additional features, such as retaining rings, tabs, and annular seal wires, may be included to secure the arms 60 and 62 to the interface regions 42. In one example, small bolts may be included for axial retainment (direction 37). In certain embodiments, one arm 60 or 62 of the seal structure 40 may be an integral extension of a wheel 34 and, therefore, only the opposite arm 60 or 62 may have a connection interface, such as a rabbet section 64, for attachment to the wheel rim 66. Moreover, in other embodiments, the arms 60 and 62 may be attached to the wheels 34 at various locations along the interface regions 42. For example, the arms 60 and 62 may be affixed to the wheel post portions 33 or to areas of the wheels 34 extending radially inward (direction 45) from the rims 66.

FIG. 4 is a perspective view of another embodiment of the seal structure 40 that includes ribs 68 attached to a radial inner surface 70 of the seal structure 40. For example, the ribs 68 may be welded, glued, bolted, or otherwise attached to the seal structure 40. In another example, the ribs 68 may be an integral part of the seal structure 40. In other embodiments, the ribs 68 may be attached to the radial outer surface of the seal structure 40. The ribs 68 may provide stiffening to control deflection along the seal structure 40. The ribs 68 may be disposed at different angular positions around the circumference of the seal structure 40. In certain embodiments, each rib 68 may include a crescent moon shape extending in the axial direction 37 (FIG. 3) between the wheels 34. The rib 68 may follow the curvature of the surface 70 and, in certain embodiments, may have a thicker cross-section beneath the web 58. The shape, size, relative dimensions, thicknesses, and number of ribs 68 may vary depending on, among others, manufacturing considerations and operational parameters for the gas turbine engine.

FIG. 4 also illustrates the rabbeted connections 64 that interface with the rims 66 of the wheels 34. In certain embodiments, the rabbeted connections 64 may form an interference fit with the rims 66. As described above with respect to FIG. 3, the catenary seal structure 40 only has two points of attachment, one point at each of the rabbeted connections 64, or grooved sections. In certain embodiments, centrifugal forces (acting generally in the direction of arrow 35) may function to hold the catenary seal structure 40 in place.

The seal rack 56 extends outwardly from the web 58 in a manner generally parallel to the axis of rotation (direction 37, shown in FIG. 3). The seal rack 56 also extends in the circumferential direction 36 to form a 360-degree ring. In certain embodiments, the thin radial web 58 may allow the seal rack 56 to extend radially outward (direction 35) from the catenary shape to maximize the width 69 of the seal rack 56. The seal rack 56 may be a separate structure or an integral part of the catenary structure 40. The seal rack 56, web 58, and catenary seal structure 40 may be constructed of the same or different materials. In certain embodiments, the seal rack 56, web 58, and catenary seal structure 40 may be constructed of high strength steels or nickel based superalloys.

According to certain embodiments, the web 58 may function to isolate the catenary structure 40 from the thermal heating that may occur at the seal rack 56. The web 58 also may function to isolate the seal rack 56 from the mechanical loads exerted on the seal structure 40. The seal rack 56 includes seal teeth 71 extending radially outward (direction 35) from the seal rack. The seal teeth 71 may extend perpendicular to the axis of rotation (direction 37, shown in FIG. 3) or may extend at varying angles with respect to the axis of rotation (direction 37). The seal teeth may extend circumferentially 36 around the catenary structure 40 to form a 360-degree ring. The seal teeth 71 may form a seal with the seal surface 54 of the stator vanes 50 (FIG. 3). The number, size, and shape of the seal teeth 71 may vary. For example, the seal teeth 71 may include triangular or T-shaped cross sections, among others.

Figure 5:
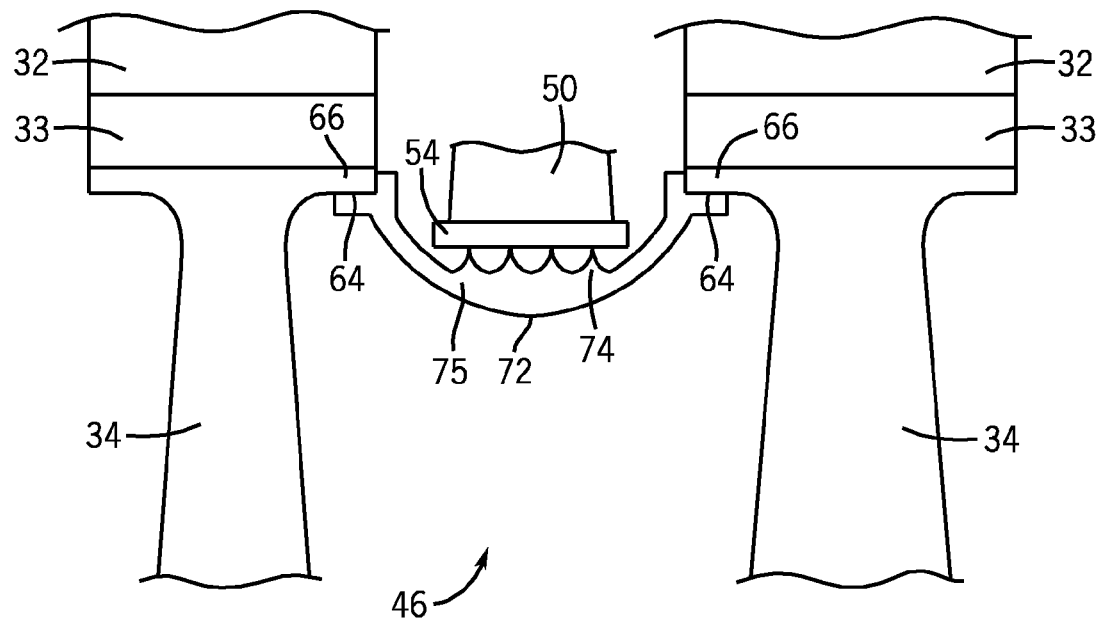
FIG. 5 is a detailed view of another embodiment of a seal that includes seal teeth disposed on the surface of the catenary structure.

FIG. 5 illustrates another embodiment of a catenary seal structure 72 that includes an integral seal rack 74. The seal rack 74 is disposed directly on the catenary curve 75 of the seal structure 72. The seal rack 74 interfaces with the seal surface 54 of stator vane 50. In certain embodiments, the integral seal rack 74 may facilitate manufacturing.

Figure 6:
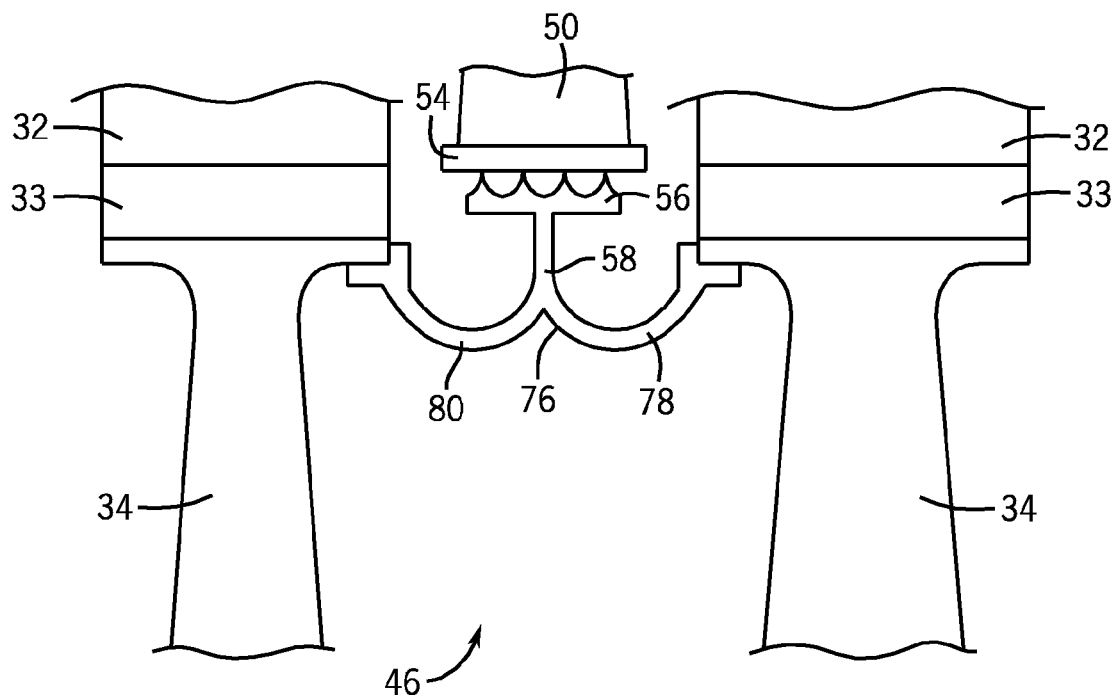
FIG. 6 is a detailed view of another embodiment of a seal.

FIG. 6 illustrates another catenary seal structure 76 that includes two separate catenary curve shaped arms 78 and 80 extending from the web 58 that supports the seal rack 56. Each arm segment 78 and 80 includes a catenary, convex curve extending into the interstage volume 46. In other embodiments, the thickness, size, and shape of the catenary structure 76 may vary. For example, in certain embodiments, the catenary curves may include combinations of concave and convex curves. In other embodiments, the catenary curves may include 360-degree rings with W-shaped cross-sections, V-shaped cross-sections, M-shaped cross-sections, or U-shaped cross-sections, among others. In another example, any number of catenary curves may be included. Further, the relative shapes and sizes of the seal rack 56 and web 58 may vary.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a pair of adjacent rotor wheels configured to rotate about an axis; and
   a catenary seal structure mechanically supported only by the adjacent rotor wheels and disposed annularly about the axis to isolate a volume between the adjacent rotor wheels from hot fluids flowing over the adjacent rotor wheels, wherein the catenary seal structure comprises a first curved arm segment and a second curved arm segment extending in opposite directions to interface with the adjacent rotor wheels, and wherein the first curved arm segment and the second curved arm segment together form a continuous convex curved section extending into the volume.

2. The system of claim 1, wherein the curved arm segments include circumferential rabbeted sections configured to connect to rims of the adjacent rotor wheels.

3. The system of claim 1, wherein the catenary seal structure comprises a seal rack configured to interface with a stator vane seal surface.

4. The system of claim 1, wherein the adjacent rotor wheels are coupled to a shaft of a gas turbine engine.

5. The system of claim 1, wherein each adjacent rotor wheel comprises a plurality of circumferentially spaced openings supporting turbine blades extending radially from the rotor wheel, and wherein the catenary seal structure interfaces with the adjacent rotor wheels at the same radial location as the circumferentially spaced openings.

6. The system of claim 1, comprising a turbine, a combustor, a compressor, or combinations thereof.

7. The system of claim 1, wherein the catenary seal structure comprises a web extending generally perpendicular to the curved arm segments and a seal rack disposed on an opposite end of the web from the curved arm segments.

8. The system of claim 7, wherein the seal rack extends generally pependicular to the web.

9. A system, comprising:
   a catenary seal structure configured to be annularly disposed about an axis and mechanically supported by two adjacent rotor wheels configured to rotate about the axis, wherein the catenary seal structure is configured to isolate a volume between the adjacent rotor wheels from hot fluids flowing over the adjacent rotor wheels, wherein the catenary seal structure comprises:
      a first curved arm segment and a second curved arm segment extending in opposite directions to interface with the adjacent rotor wheels;
      a web extending generally perpendicular to the curved arm segments; and
      a seal rack disposed on an opposite end of the web from the curved arm segments; and
      a pair of connection interfaces configured to be annularly disposed about the axis on opposite axial faces of the catenary seal structure and configured to attach the catenary seal structure to the two adjacent rotor wheels to mechanically support the catenary seal structure without intermediate support between the opposite axial faces of the catenary seal structure.

10. The system of claim 9, wherein the connection interfaces comprise rabbets configured to mate with rims of the two adjacent rotor wheels.

11. The seal of claim 9, comprising ribs spaced annularly along the catenary seal structure and extending between the opposite axial faces, wherein the ribs each comprise a crescent moon shape extending in the axial direction between the pair of connection interfaces.

12. The system of claim 9, wherein the first curved arm segment and the second curved arm segment together form a continuous convex curved section extending into the volume.

13. The system of claim 9, wherein the seal rack is disposed on a radially outward portion of the catenary seal structure and is configured to interface with a seal surface of a stator vane.

14. The system of claim 13, wherein the seal rack, the web, and the curved arm segments comprise an integral structure.

15. A system, comprising:
   a rotary machine comprising:
      a first rotor wheel rotational about an axis and comprising first blades extending radially from the first rotor wheel;
      a second rotor wheel rotational about the axis and comprising second blades extending radially from the second rotor wheel; and
      a catenary seal structure mechanically supported only by the first and second rotor wheels and disposed annularly about the axis to isolate a volume between the first and second rotor wheels from a flow path extending through the first and second blades, wherein the catenary seal structure comprises a first curved arm segment and a second curved arm segment extending in opposite directions to interface with the first and second rotor wheels, and wherein the first curved arm segment and the second curved arm segment together form a continuous convex curved section extending into the volume.

16. The system of claim 15, wherein the rotary machine comprises a turbine engine or a compressor.

17. The system of claim 15, wherein the catenary seal structure includes a plurality of seal teeth integrated into a concave side of the convex curved section.

18. The system of claim 15, wherein the volume is configured to receive discharge air from a compressor to exchange heat with the first and second rotor wheels.

19. The system of claim 15, wherein the catenary seal structure is integral with one of the first or second rotor wheels.

20. The system of claim 15, wherein the catenary seal structure comprises:
   a web extending generally perpendicular to the curved arm segments at an interface between the curved arm segments; and
   a seal rack disposed on an opposite end of the web from the curved arm segments.

* * * * *